United States Patent [19]

Fine et al.

[11] 4,349,597

[45] Sep. 14, 1982

[54] PRODUCTION OF SYNTHETIC LEATHER

[75] Inventors: Jerome Fine; Gene N. Harrington, both of Cleveland, Tenn.

[73] Assignee: Cleveland Plastics of Tennessee, Inc., Cleveland, Tenn.

[21] Appl. No.: 166,543

[22] Filed: Jul. 7, 1980

[51] Int. Cl.³ .................... B32B 5/14; B32B 5/18; B32B 5/20; B32B 5/24; B32B 5/32

[52] U.S. Cl. .................. 428/95; 156/79; 156/153; 156/246; 156/247; 156/322; 427/209; 427/244; 427/246; 427/368; 427/373; 427/381; 427/407.3; 428/96; 428/213; 428/215; 428/218; 428/311.5; 428/316.6; 428/317.9; 428/318.4; 428/318.8; 428/319.7; 428/339; 428/904

[58] Field of Search .............. 427/209, 244, 245, 368, 427/373, 381, 412, 389.8, 407.3; 156/231, 247, 79, 246, 153, 322; 428/904, 95, 96, 213, 215, 218, 311.5, 316.6, 317.9, 318.4, 318.8, 319.7, 339

[56] References Cited

U.S. PATENT DOCUMENTS

| | | |
|---|---|---|
| 3,399,102 | 8/1968 | Matsushita et al. |
| 3,462,236 | 8/1969 | Steel et al. |
| 3,496,056 | 2/1970 | Steel et al. |
| 3,537,947 | 11/1970 | Brazdionis |
| 3,574,021 | 4/1971 | Van Buskirk et al. |
| 3,637,456 | 1/1972 | Mao . |
| 3,660,218 | 5/1972 | Shepherd . |
| 3,677,871 | 7/1972 | Oohara et al. |
| 3,719,549 | 3/1973 | Mitturan . |
| 3,794,548 | 2/1974 | Wirth et al. |
| 3,816,233 | 6/1974 | Powers . |
| 3,861,937 | 1/1975 | Hanneken et al. |
| 3,873,406 | 3/1975 | Okazaki et al. |
| 3,941,633 | 3/1976 | Wang . |
| 3,968,292 | 7/1976 | Pearman .......................... 428/904 |
| 3,974,320 | 8/1976 | Gerlach et al. .................... 427/412 |
| 4,003,777 | 1/1977 | Eddy . |
| 4,017,656 | 4/1977 | Lasman et al. |

FOREIGN PATENT DOCUMENTS 1398238 6/1975 United Kingdom .............. 156/231

Primary Examiner—James C. Cannon
Attorney, Agent, or Firm—Luke J. Wilburn, Jr.; Wellington M. Manning, Jr.

[57] ABSTRACT

A composite synthetic leather sheet material and method of manufacture thereof is disclosed. The composite sheet material comprises outer thermoplastic polymeric layers bonded to opposite faces of a reinforcing textile fabric, preferably a porous woven fabric of high strength material, by an intermediate polymeric layer which fills the interstices of the fabric and has opposite surfaces disposed adjacent the fabric surfaces to engage and firmly secure the outer thermoplastic polymeric layers in the composite sheet. One of the outer thermoplastic layers is foamed to a relatively high degree and the outer surface of the foam is mechanically abraded or buffed to provide a suede-like leather appearance thereto. The other outer thermoplastic layer may be foamed and provided with an embossed leather-like surface appearance. The sheet material product is reversible in use, completely heat-sealable, flow-moldable, and printable on both sides for subsequent manufacture of synthetic leather good articles.

The polymeric layers of the composite sheet are preferably applied to the reinforcing fabric in plastisol form, and all of the layers may be foamed in varying degrees, if desired. The sheet material is produced by applying a first thermoplastic polymeric layer to an embossed release paper, heating the first layer to a tacky state, applying a reinforcing fabric to the surface of the tacky layer, and impregnating the fabric with a second polymeric composition to fill the interstices and contact the lower polymeric layer on the release paper. The sheet is heated to gel the two polymeric layers and a third foamed or foamable thermoplastic polymeric layer is applied to the exposed surface of the sheet. The resultant composite is heated to foam, cure and fusion bond the polymeric layers, and the unembossed foamed polymeric layer is thereafter mechanically abraded to impart a suede-like leather appearance thereto.

29 Claims, 3 Drawing Figures

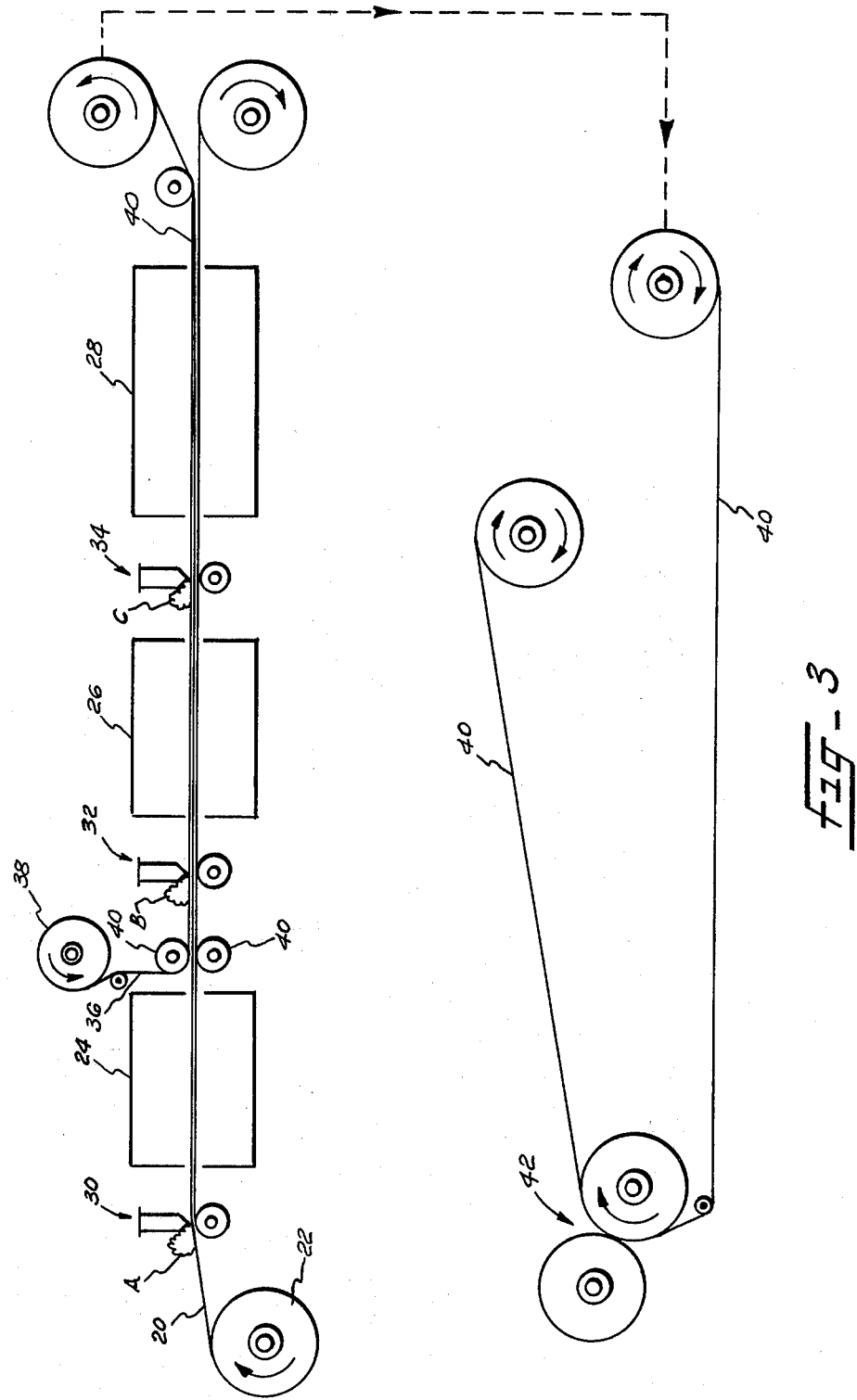

PRODUCTION OF SYNTHETIC LEATHER

This invention relates to the production of synthetic leather materials, and, more particularly, to a method of producing synthetic leather products and the resulting novel products produced thereby.

BACKGROUND OF THE INVENTION

It is known to produce synthetic polymeric sheet materials simulating the appearance of natural leather. Such materials find numerous end uses as a substitute for natural leather, as in manufacture of footwear, handbags, wallets, wearing apparel, accessories, uphoistery materials and the like. Such synthetic leather materials often are formed by coating or laminating a reinforcing substrate, such as woven, nonwoven, or knit textile fabric, with synthetic resinous polymers, and the patented art is replete with disclosures of various combinations of such polymeric conponents to provide particular characteristics for the desired end use of the products.

Within the patented prior art, U.S. Pat. No. 4,017,656 discloses a particular imitation leather material which consists of a plurality of polymeric layers secured to a woven fabric base. One face of the fabric contains two layers of a polymeric foam with a thin urethane outer skin which is embossed to simulate an imitation leather-like surface. The other face of the woven fabric is napped and saturated with a nitrile elastomeric material which is cross-linked by heating. Thereafter, the napped surface is abraded to produce a leather, flesh-like appearance, with the ends of the napped fibers exposed on the impregnated surface.

U.S. Pat. No. 3,941,633 discloses a plastic laminate article having a polyurethane film substrate, a layer of polyurethane foam bonded thereto, and a woven fabric superstrate bonded in the foam layer, either by use of an adhesive or by partial curing of the foam layer with pressure application of the fabric thereto.

U.S. Pat. No. 3,719,549 discloses a plastic sheeting having an abraded and embossed surface of foamed plastic on a support backing, which may be composed of glass fibers. The patent discloses that the embossed appearance in the foamed layer may be achieved by use of an intermediate embossed plastic layer which strikes through the foamed abraded surface layer, or the foamed surface layer may itself be embossed and abraded to provide the desired surface appearance.

OBJECTS OF THE PRESENT INVENTION

It is an object of the present invention to provide a fabric-reinforced polymeric sheet material of the general type described in the aforementioned U.S. Pat. No. 4,017,656, which has improved characteristics, particularly suited for use of the material in the manufacture of products such as shoes, handbags, apparel, accessories, upholstery, and the like.

It is another object to provide an improved composite synthetic leather sheet material of high strength, durability, softness, and drapability, and which is completely reversible in use, and is heat sealable, flow moldable, and surface printable to facilitate manufacture of various end products and articles.

It is a further object to provide a composite fabric-reinforced synthetic leather-like material which is believed less costly to manufacture than products of the prior art requiring napped reinforcing fabrics or additional adhesives to ensure effective bonding of the composite layers of the material.

It is still a further object to provide an improved method of manufacturing a composite fabric-reinforced, synthetic leather sheet material having surfaces of dissimilar leather-like appearance which is completely reversible, flow-moldable, and heat sealable in end use manufacture of various products.

SUMMARY OF THE INVENTION

The present invention relates to improved, flexible, synthetic leather sheet materials of high strength and durability, having reversible, leather-appearance surfaces, at least one of which is of suede-like appearance, and wherein both faces of the sheet materials are heat-sealable, printable, and flow-moldable to facilitate subsequent manufacture of leather good articles and products. The sheet material is a composite, comprising a reinforcing textile fabric located between two layers of thermoplastic polymeric material, at least one of which is a thermoplastic polymeric foam having an outer surface mechanically buffed to provide a suede leather-like appearance. The outer surface of the other polymeric layer is preferably embossed to give a different leather-like appearance thereto, although it could be foamed and buffed to provide a suede look, if desired.

The two outer polymeric layers forming opposite surfaces of the composite are firmly bonded and secured to the intermediate reinforcing fabric by an intermediate layer of polymeric material which fills the interstices of the fabric and provides a surface adjacent both faces of the fabric for high strength fusion bonding with the outer thermoplastic layers.

In a preferred embodiment, the reinforcing textile fabric of the composite sheet comprises a porous woven fabric of high strength, such as a glass yarn screen material. As synthetic polymers forming the layers of the composite sheet, thermoplastic polymers in plastisol form are preferred, and in particular, polyvinyl chloride plastisols are preferred for high strength fusion bonding of the outer and intermediate layers in accordance with the preferred method of manufacture of the composite, as will be hereinafter described.

The outer polymer layer which is buffed to provide the suede surface of the composite material is comprised of a layer of relatively low density, foamed polyvinyl chloride, while the outer layer having the embossed surface appearance is preferably a foamed polyvinyl chloride layer of higher density than the suede layer. By providing an intermediate polymeric layer within the interstices of the fabric, the outer foamed layers may be firmly bonded to the reinforcing fabric to provide high peel strength, without appreciable loss of flexibility and drapability of the sheet material, and without the necessity of employing more expensive napped woven fabrics, with exposed napped fibers, to achieve the suede-like appearance on one face of the sheet material, as in prior U.S. Pat. No. 4,017,656.

In a preferred method of manufacture of the sheet materials of the present invention, a first thermoplastic polymeric plastisol composition is applied to a continuously moving embossed release paper to form a layer thereon, and the layer heated to gel the plastisol to a tacky condition. One face of a fabric reinforcing material is continuously brought into pressure contact with the exposed surface of the tacky plastisol layer, and the upper face of the fabric is then impregnated with a second polymeric plastisol composition having a viscosity suffifient to completely fill the interstices of the fabric and engage the underlying thermoplastic plastisol layer on the release paper. The coated and impregnated fabric is then heated to completely gel the two plastisol compositions, and the upper exposed surface of the fabric containing the second plastisol layer disposed in the interstices thereof is coated with a third foamed or foamable thermoplastic plastisol composition having a high foam ratio and lower density than the density of the first two applied plastisol layers.

The composite product is thereafter passed through a heating oven to gel, fuse, cure, and expand the foamable thermoplastic composition layers and fuse bond the same to each other, with the reinforcing fabric completely embedded therein. The outer surface of the unembossed foam layer of the composite is mechanically buffed or sanded to impart a suede leather-like appearance thereto.

The finished sheet material may be subsequently printed on one or both sides, top-coated or post-embossed, as desired, and both sides are heat sealable, flow-moldable, and completely reversible in use and manufacture of leather-like end products.

BRIEF DESCRIPTION OF THE DRAWINGS

The objects of the present invention will become more apparent, and the invention will be better understood, from the following detailed description of preferred embodiments of the invention, when taken together with the accompanying drawings, in which:

FIG. 3 is a schematic side elevation view of apparatus employed in commercial production of the composite synthetic leather materials of the present invention, illustrating the flow path of the material in the continuous production line operation.

DETAILED DESCRIPTION OF PREFERRED EMBODIMENTS

Figure 1:
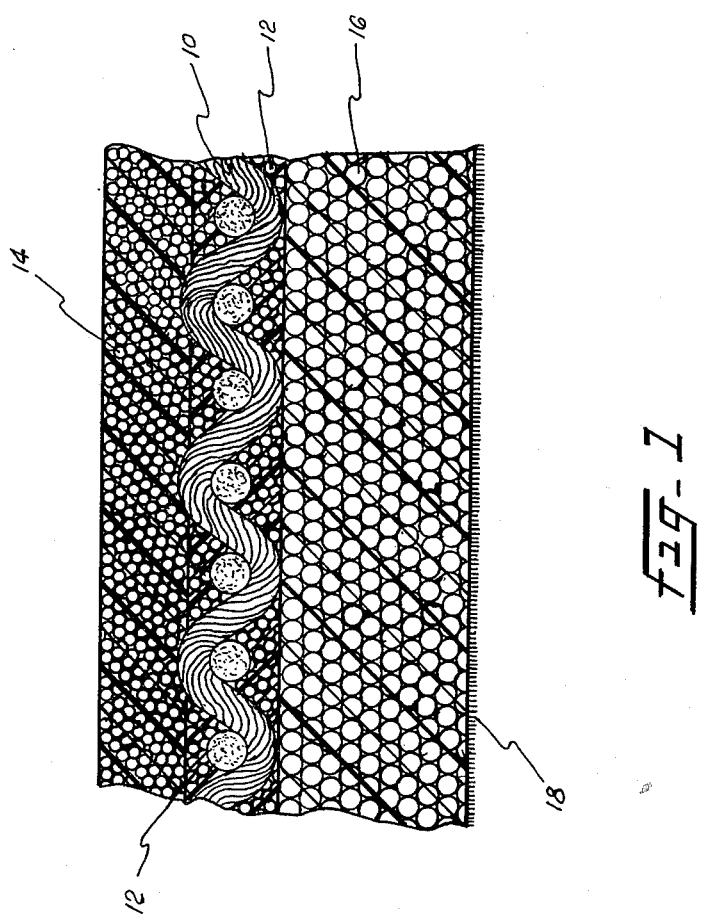
FIG. 1 is a schematic cross-sectional view of the composite synthetic leather sheet material of the present invention, illustrating the construction and location of the composite layers forming the same.

Referring more particularly to the drawings, FIG. 1 shows in schematic cross-section, a synthetic leather sheet material of the present invention which comprises a porous textile woven fabric 10 of high strength, such as a vinyl-coated glass yarn screening material of the type employed in porch and window screens, the interstices of which are filled with an intermediate layer 12 of polymeric material, such as an unfoamed or foamed vinyl plastisol or relatively high density. Plastisol layer 12 is located within the interstices of the fabric 10 so as to provide upper and lower surfaces of the layer exposed adjacent the upper and lower surfaces of the woven fabric.

Secured to the upper surface of the polymer-impregnated fabric and fusion bonded to the upper surface of the first polymeric layer 12 is a second outer layer 14 of thermoplastic polymeric material, such as a polyvinyl chloride plastisol foam having foam density approximately the same as or somewhat less than intermediate layer 12 in the interstices of fabric 10. The exposed upper surface of layer 14 is embossed in a design simulating a leather-like appearance.

Secured to the lower surface of fabric 10 and fusion bonded to the surface of intermediate layer 12, as seen in FIG. 1, is a third thermoplastic foamed polymeric layer 16, such as a vinyl plastisol foam. Layer 16 has relatively low density and corresponding high foam ratio, as compared to the first and second polymer layers 12, 14 of the composite. The exposed face of layer 16 is mechanically sanded, buffed or abraded such that the pores of the highly foamed layer 16 provide a suede leather surface appearance 18 for the composite sheet.

As seen in FIG. 1, the reinforcing woven fabric 10 of the composite sheet material is totally embedded within and covered by the polymeric layers of the sheet, and the interstices of fabric 10 are substantially completely filled with and by the intermediate polymeric layer 12. Exceptional strength and durability of the sheet is obtained by use of a woven glass yarn fabric; however, other yarn types and fabric constructions, e.g., nonwovens, knits, could be employed as the reinforcing component of the composite sheet where high strength is not required.

As polymeric materials which may be employed in the synthetic leather sheet, synthetic polymers in plastisol form are preferred for ease of application and high strength fusion bonding of the composite layers of the sheet. In particular, foamed vinyl plastisols have been found to be particularly desirable for application and use. The thermoplastic outer layers of the sheet are preferably of varying foam density, and the suede leather-like surface layer 16 is relatively highly foamed to provide softness of hand and a suede-like appearance upon buffing.

Although polyvinyl chloride thermoplastic polymers are preferred, as aforementioned, other thermoplastic polymeric materials capable of being foamed could be employed as the outer layers of the composite sheet to provide heat sealability and flow moldability in end uses of the sheet material. Such polymeric materials known in the prior art include thermoplastic urethanes, polyamides, and the like.

The thickness of the composite sheet material, as well as the particular thickness of the individual polymeric layers forming the composite, may be varied, depending on the end use requirements of the material. In a preferred embodiment, the total composite sheet thickness may be between about 60 to 70 mils, with the low density highly foamed layer forming the suede-like leather surface of the product comprising a major portion of the total thickness, or between about 30 to 40 mils. The intermediate polymeric layer 12 must be of sufficient thickness to substantially completely fill the interstices of the reinforcing fabric 10 and appear adjacent opposite surfaces of the fabric for effective fusion bonding to the outer layers of the composite. The embossed outer layer 14 of the fabric may be from about 10 to 20 mils in thickness, or approximately that thickness of the intermediate layer 12 to which the outer layer 14 is secured.

In a preferred form of embodiment, the outer vinyl plastisol layers 14, 16 forming the composite product are both foamed, with the buffed suede leather-like surface layer 16 being foamed, or expanded, to at least twice the thickness of embossed leather-like layer 14 of the composite. Although the plastisol compositions may be foamed mechanically by use of conventional mechanical foaming equipment prior to application of the reinforcing fabric, it is preferred to incorporate a conventional foaming or blowing agent, such as an azodicarbonamide, into the plastisols, with expansion and foaming of the layers taking place during final heat curing operations of the process.

Figure 2:
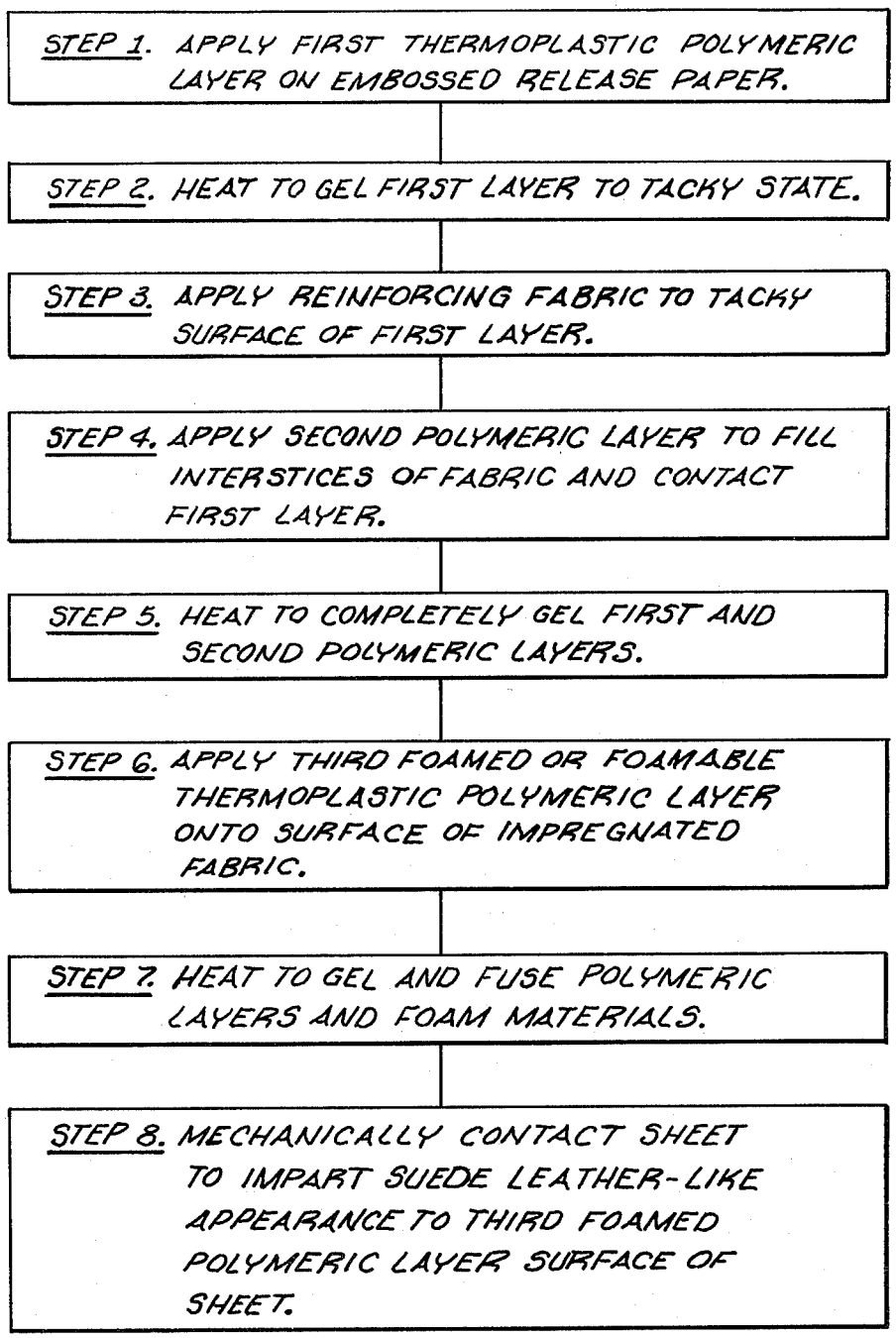
FIG. 2 is a schematic block diagram illustrating the method steps of manufacturing the composite sheet material of FIG. 1.

The process of the present invention may be described by particular reference to FIGS. 2 and 3 of the drawings. FIG. 3 illustrates schematically a commercial production range for the manufacture of the composite synthetic leather sheet material. As seen, a conventional coated release paper 20, which may be suitably embossed with a desired pattern simulating a natural leather appearance, is continuously fed from a supply roll 22 in a generally horizontal path through three heating ovens 24, 26, 28, each of which is preceded by a polymer applicator station, 30, 32, 34, respectively. At station 30, a first flowable plastisol composition A is applied in a layer of desired thickness to the surface of the embossed release paper, as by knife coating, roller coating, or the like. The release paper containing the plastisol composition layer is passed through oven 24 where it is heated to a sufficient temperature to gel the plastisol composition to a tacky state. Upon leaving oven 24, a continous length of woven fabric 36, such as a vinyl coated fiberglass screening material, is fed from a supply roll 38 onto the upper surface of the tacky plastisol layer, with adjustable pressure rolls 40 being employed to slightly press the contacting surface of the woven fabric into the plastisol layer to a desired depth. A second plastisol composition B, which may contain a blowing agent, if desired, is then applied to the upper surface of the woven fabric, as by conventional knife-over-roll or coating roll at applicator station 32 such that plastisol composition B substantially completely fills the interstices of the woven fabric and passes therethrough to contact the upper surface of underlying plastisol composition A. The pressure of application and viscosity of plastisol composition B is controlled to ensure substantially total filling of the interstices of the woven fabric and penetration to a depth therein to contact the first plastisol layer.

After application of plastisol layer B, the paper 20 containing the composite materials passes through second heating oven 26 which is maintained at a temperature to completely gel the two plastisol layers. Thereafter, a third thermoplastic polymeric plastisol composition C, either mechanically foamed or containing a blowing or foaming agent, is applied to the upper surface of the composite material to a desired thickness, as by knife-over-roll or cooling roll, at coating station 34, and the release paper containing the materials passes through third heating oven 28 which is maintained at a temperature to completely get and fuse the plastisol layers to each other, and blow the foaming agents therein to expand the layers. The composite product 40 may then be removed from the release paper and collected in roll form for subsequent mechanical buffing treatment.

The cured composite sheet material 40 is then directed by suitable guide means, not shown, through a surface buffing machine, such as a Curtin-Herbert-Lima brush-type sanding machine 42, where the unembossed foamed layer of the composite sheet is buffed or abraded to impart a suede leather-like appearance thereto. The composite sheet material 40 is collected in roll form for subsequent treatment, such as top coating or printing, or for use, as is, in the manufacture of various leather good products.

The composite synthetic leather sheet material may be colored by various dyestuffs or pigments incorporated into the plastisol compositions prior to application to the reinforcing woven fabric. The resultant composite sheet material containing the reinforcing fabric totally covered by and encapsulated within the outer thermoplastic polymer layer is completely reversible in use, heat-sealable, flow-moldable, and printable for manufacture of subsequent products.

The following example illustrates a preferred composition of the composite sheet material of the present invention and its preferred method of manufacture. As used herein, the term "blow ratio" refers to the ratio of the thickness of a foamed layer of polymeric material, as compared to an unfoamed layer of the polymer material of equivalent solids content by weight.

EXAMPLE 1

Three plastisol compositions, A, B, and C, are prepared for application to a vinyl-coated fiberglass woven fabric having a 16 by 18 thread count, a thickness of 14 mils and a weight of 3.6 oz. per sq. yd. The plastisol compositions contain the following components, with amounts thereof expressed in parts per hundred and percentages of the total composition by weight. A preferred range of amounts in which the ingredients may be varied in the compositions is also included in the following table:

| Component | Preferred PHR | % | Preferred Ranges From % | To % |
|---|---|---|---|---|
| PLASTISOL A | | | | |
| Dioctyl Phthalate (plasticizer) | 54.0 | 25.7 | 20 | 45 |
| Dihexyl Phthalate (plasticizer) | 7.0 | 3.3 | 0 | 10 |
| Sunthene 410 (a volatile naphthenic oil plasticizer, mfg. by Sun Chemical Company) | 3.0 | 1.4 | 0 | 5 |
| Pliovic DR450 PVC Resin (Goodyear Chemicals) (vinyl chloride polymer having an inherent viscosity of 0.90 and ave. particle size of 1-3 microns) | 70.0 | 33.3 | 20 | 40 |
| Pliovac Resin M70 (Goodyear Chemicals) (vinyl chloride polymer having inherent viscosity of 0.86 and ave. particle size of 25 microns) | 30.0 | 14.3 | 5 | 20 |
| Calcium Carbonate (powder) | 25.0 | 11.9 | 5 | 35 |
| Plasticized Pigments | 15.0 | 7.0 | 4 | 10 |
| Blowing agent mixture of azodicarbonamide with DOP plasticizer and zinc soap stabilizer | 6.0 | 3.0 | 0 | 6 |
| Blow Ratio (when foamed) | 2:1 | | 1:1 | 4:1 |
| Viscosity (centipoise) | 3500 | | 2500 | 4500 |
| PLASTISOL B | | | | |
| Dioctyl Phthalate (plasticizer) | 90 | 36.0 | 25 | 40 |
| Dihexyl Phthalate (plasticizer) | 7 | 2.9 | 0 | 10 |
| Sunthene 410 (plasticizer) | 3 | 1.1 | 0 | 5 |
| Pliovic DR450 PVC Resin | 70 | 28.7 | 20 | 40 |
| Pliovic M70 Resin | 30 | 11.3 | 5 | 20 |
| Calcium Carbonate (powder) | 25 | 10.0 | 5 | 35 |
| VS 103 (Air Products and Chemical, Inc., PVC Cell Stabilizer) | 1 | 1.0 | 0 | 2 |
| Plasticized Pigments | 15 | 6.0 | 4 | 10 |
| Blowing agent mixture, as in A | 6 | 3.0 | 0 | 6 |
| Blow Ratio | 2:1 | | 1:1 | 4:1 |
| Viscosity (centipoise) | 1500 | | 1250 | 2000 |
| PLASTISOL C | | | | |

-continued

| Component | Preferred PHR | % | Preferred Ranges From % | To % |
|---|---|---|---|---|
| Dioctyl Phthalate (plasticizer) | 90.0 | 35.0 | 25 | 40 |
| Dihexyl Phthalate (plasticizer) | 7.0 | 2.7 | 0 | 10 |
| Sunthene 410 (plasticizer) | 3.0 | 1.2 | 0 | 5 |
| Pliovic DR450 PVC Resin | 70.0 | 27.4 | 20 | 40 |
| Pliovic M70 Resin | 30.0 | 11.5 | 5 | 20 |
| Calcium Carbonate (powder) | 25.0 | 9.2 | 5 | 35 |
| VS 103 (cell stabilizer) | 1.0 | 1.0 | 0 | 2 |
| Plasticized Pigments | 15.0 | 6.0 | 4 | 10 |
| Blowing agent mixture, as in A | 12.0 | 6.0 | 3 | 8 |
| Blow Ratio | 4:1 | | 2:1 | 5:1 |
| Viscosity (centipoise) | 1500 | | 1250 | 2000 |

Each of the three plastisol compositions are formulated by combination of ingredients in the following manner:

In each composition, the ingredients are added to a 10,000 lb. blender mixer device in the following order: (1) plasticizers (e.g., dioctyl phthalate, di-hexyl phthalate, Sunthene 410); (2) prime resin (DR450); (3) secondary blending resin (M70); (4) filler (calcium carbonate); (5) blow mixture; (6) cell stabilizers (VS 103).

After a period of mixing of the above ingredients, the plasticized pigments are added to the blend mixture and viscosity control agents, e.g., additional plasticizers, mineral spirits, may be added if desired.

The three plastisol compositions A, B, and C, are applied, in order, at the respective polymer applicator stations 30, 32, 34, as hereinbefore described and shown in FIG. 3 of the drawings. The respective heating ovens 24 and 26 are maintained at a temperature of approximately 250° F., and heating oven 28 is maintained at a temperature of approximately 400° F. to heat the applied plastisols to the appropriate tack or gel state, and to cure, fuse bond and release the blowing agents to foam the plastisols, in the order described. The composite sheet product is removed from the embossed release paper and the unembossed foamed surface of the sheet is subjected to buffing operations in the buffing machine of FIG. 3 to provide a suede-like leather appearance to the foamed layer surface of the sheet.

After buffing, one or both sides of the composite sheet may be printed, top-coated, and post-treated, as desired. The resultant synthetic leather sheet material has excellent tear strength, peel strength, drapability, and softness of hand. If desired for additional abrasion resistance, the embossed surface of the sheet may be provided with a protective skin coating, such as a urethane in organic solution form. In such case, the urethane solution may be applied to the release paper before application of the first plastisol composition at applicator station 30, with the solvent being evaporated off in oven 24.

That which is claimed is:

1. A fabric-reinforced composite sheet material having opposite surfaces of leather-like appearance comprising:
   (a) a textile fabric having a first polymeric layer disposed within and filling the interstices of the fabric to the extent that it is present adjacent opposite faces of the fabric;
   (b) a second thermoplastic polymeric layer on one face of the fabric bonded to said first polymeric layer and having an outer leather-like surface appearance;
   (c) a third thermoplastic essentially fiber-free polymeric foam layer on the opposite face of said fabric bonded to said first polymeric layer and having an outer suede leather-like surface appearance; and wherein
   (d) said fabric faces are completely covered with the polymeric layers, and both leather-like outer surfaces of the composite sheet are heat-sealable, flow-moldable and reversible for subsequent manufacture of products having a natural leather-like appearance.

2. A composite sheet material as defined in claim 1 wherein said fabric comprises a woven glass yarn fabric of relatively porous construction.

3. A composite sheet material as defined in claim 2 wherein the glass yarns of the fabric are vinyl coated prior to their combination in said composite sheet material.

4. A composite sheet material as defined in claim 1 wherein said second polymeric layer is of foamed construction having a greater foam density than said third foam layer.

5. A composite sheet material as defined in claim 4 wherein said outer surface of said second polymeric layer is embossed to provide its leather-like appearance.

6. A composite sheet material as defined in claim 5 wherein said second polymeric layer has a foam blow ratio of about one-half the foam blow ratio of said third polymeric foam layer.

7. A composite sheet material as defined in claim 6 wherein said second layer has a foam blow ratio of about 2 to 1 and said third layer has a foam blow ratio of about 4 to 1.

8. A composite sheet material as defined in claim 6 wherein said third layer has a thickness of at least about one-half the total thickness of the composite sheet material.

9. A composite sheet material as defined in claim 4 wherein said first polymeric layer is of foamed construction.

10. A composite sheet material as defined in claim 9 wherein the foam density of said first and second layers are about the same, and the foam density of said third layer is about one-half the density of said first or second layers.

11. A composite sheet material as defined in claim 4 wherein said second and third thermoplastic polymeric layers forming said leather-like surface of the sheet comprise a foamed plastisol composition.

12. A composite sheet material as defined in claim 11 wherein said polymeric layers comprise a polyvinyl plastisol composition.

13. A composite sheet material as defined in claim 12 wherein all of said polymeric layers are polyvinyl plastisol compositions.

14. A composite sheet material as defined in claim 13 wherein the foam blow ratio of said first and second layers is about 2 to 1.

15. A composite sheet material as defined in claim 14 wherein the foam blow ratio of the third polymeric layer is between about 4 to 1 to about 5 to 1.

16. A composite sheet material as defined in claim 15 wherein the foam blow ratio of the third polymeric layer is about 4 to 1.

17. A composite sheet material as defined in claim 1 wherein the thickness of the composite sheet is from about 60 to 70 mils.

18. A composite sheet as defined in claim 17 wherein each of said first and second layers are between about 13 to 17 mils in thickness, and said second foam layer is from about 30 to 40 mils in thickness.

19. A sheet material as defined in claim 1 wherein said second and third polymeric layers are pigmented to give a desired color thereto.

20. A composite sheet material as defined in claim 1 wherein said outer surface of said third polymeric foam layer is mechanically buffed to provide said suede-like leather appearance.

21. A method of producing a composite, fabric-reinforced sheet material having a leather-like surface appearance on both faces thereof comprising the steps of providing a release paper, applying a first layer of thermoplastic polymeric material to the surface of the paper, heating the first polymeric layer to a tacky state, applying a porous textile reinforcing fabric to the exposed surface of the tacky polymeric layer on the release paper to adhere one surface thereof to the layer, applying a second layer of polymeric material to the exposed surface of the textile fabric to substantially fully impregnate the interstices thereof and contact said first layer of thermoplastic polymeric material on the release paper, heating said first and second layered textile fabric to substantially gel the first and second layers thereon, applying a third layer of fiber-free foamed or heat-foamable thermoplastic polymeric material to the surface of the reinforcing fabric to contact the second polymeric layer disposed within the interstices thereof, heating the resultant composite layered product to cure and solidify the polymeric material layers and bond the same into a composite structure, and to foam the third thermoplastic layer, if heat-foamable, and mechanically contacting the foamed third polymeric layer surface to impart a suede leather-like appearance thereto.

22. A method as defined in claim 21 wherein the release paper is provided with an embossed surface to impart an embossed leather-like surface appearance to the first layer of thermoplastic polymeric material applied thereto.

23. A method as defined in claim 21 wherein said first layer of polymeric material is foamed or contains a foaming agent therein to provide a foam blow ratio of about 2 to 1, and wherein said third polymeric layer is foamed to a blow ratio of about 4 to 1.

24. A method as defined in claim 21 wherein all of said layers of polymeric material are applied to plastisol form, and wherein said first and third layers are fusion bonded to said second layer during heating of the composite layered product to cure and solidify the same.

25. A method as defined in claim 24 wherein all three polymeric layers are foamed or contain a foaming agent to provide a foam blow ratio of about 2 to 1 in said first and second layers, and about 4 to 1 in said third layer.

26. A method as defined in claim 21 wherein said release paper is of an indefinite length and is moved in a generally horizontal direction during application of said polymeric layers and textile fabric thereto, and wherein said release paper is removed from the cured composite layered product before mechanically contacting the surface of the third layer to impart the suede leather-like appearance thereto.

27. A method as defined in claim 21 wherein each of said polymeric layers are applied as plastisol compositions, and wherein the plastisol compositions of said first and third layers contain a foaming agent to foam the layers during curing of the composite layered product.

28. A method as defined in claim 27 wherein said first and third polymeric layers are fusion bonded to the second polymeric layer during curing of the composite layered product.

29. A method as defined in claim 28 wherein the polymeric layers comprise polyvinyl chloride thermoplastic polymeric compositions.

* * * * *

UNITED STATES PATENT AND TRADEMARK OFFICE
CERTIFICATE OF CORRECTION

PATENT NO. : 4,349,597
DATED : September 14, 1982
INVENTOR(S) : Jerome Fine and Gene N. Harrington It is certified that error appears in the above-identified patent and that said Letters Patent are hereby corrected as shown below:

Column 1, line 14, "uphoistery" should read --upholstery--.

Column 3, line 55, "or" should read --of--.

Column 7, line 25, "filler" should read --fillers--.

Column 8, Claim 1, (d), line 8, "with" should read --within--.

Signed and Sealed this

Twenty-fourth Day of May 1983

[SEAL]

Attest:

DONALD J. QUIGG

Attesting Officer — Acting Commissioner of Patents and Trademarks